(12) United States Patent
Monkman et al.

(10) Patent No.: US 11,685,697 B2
(45) Date of Patent: Jun. 27, 2023

(54) INTEGRATED CARBON DIOXIDE CAPTURE

(71) Applicant: CarbonCure Technologies Inc., Dartmouth (CA)

(72) Inventors: George Sean Monkman, Halifax (CA); Robert Niven, Ketch Harbour (CA); Kevin Cail, Sarasota, FL (US); John Kline, Allentown, PA (US)

(73) Assignee: CARBONCURE TECHNOLOGIES INC., Dartmouth (CA)

( * ) Notice: Subject to any disclaimer, the term of this patent is extended or adjusted under 35 U.S.C. 154(b) by 0 days.

(21) Appl. No.: 16/683,416

(22) Filed: Nov. 14, 2019

(65) Prior Publication Data

US 2020/0223760 A1    Jul. 16, 2020

Related U.S. Application Data

(63) Continuation of application No. 15/184,219, filed on Jun. 16, 2016, now Pat. No. 10,570,064, which is a continuation of application No. PCT/CA2015/050195, filed on Mar. 16, 2015.

(60) Provisional application No. 61/976,360, filed on Apr. 7, 2014.

(51) Int. Cl.
| | |
|---|---|
| *C04B 7/34* | (2006.01) |
| *C04B 28/04* | (2006.01) |
| *C04B 40/02* | (2006.01) |
| *B01D 53/73* | (2006.01) |
| *C01B 32/55* | (2017.01) |
| *B01D 53/02* | (2006.01) |
| *C02F 1/66* | (2023.01) |
| *C04B 7/00* | (2006.01) |
| *C04B 28/00* | (2006.01) |
| *C04B 32/00* | (2006.01) |
| *C04B 2/10* | (2006.01) |
| *B01D 53/14* | (2006.01) |
| *B01D 53/22* | (2006.01) |
| *B01D 53/04* | (2006.01) |
| *B01D 53/62* | (2006.01) |
| *C02F 103/12* | (2006.01) |

(52) U.S. Cl.
CPC .......... *C04B 40/0236* (2013.01); *B01D 53/02* (2013.01); *B01D 53/73* (2013.01); *C01B 32/55* (2017.08); *C02F 1/66* (2013.01); *C04B 28/04* (2013.01); *B01D 53/04* (2013.01); *B01D 53/1475* (2013.01); *B01D 53/22* (2013.01); *B01D 53/62* (2013.01); *B01D 2252/204* (2013.01); *B01D 2257/504* (2013.01); *B01D 2258/0233* (2013.01); *B01D 2258/0283* (2013.01); *C02F 2103/12* (2013.01); *Y02C 20/40* (2020.08); *Y02P 20/129* (2015.11); *Y02P 20/151* (2015.11)

(58) Field of Classification Search
CPC .. C04B 7/00; C04B 7/34; C04B 28/00; C04B 32/00; C04B 28/04; C04B 2/10; C04B 40/0236; C01B 32/55; B01D 53/02; B01D 53/73; B01D 53/1475; C02F 1/66
USPC ........................................ 106/638, 713, 739
See application file for complete search history.

(56) References Cited

U.S. PATENT DOCUMENTS

| | | |
|---|---|---|
| 128,980 A | 7/1872 | Rowland |
| 170,594 A | 11/1875 | Richardson |
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Kilburn |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 3,976,445 A | 8/1976 | Douglas |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |

(Continued)

FOREIGN PATENT DOCUMENTS

| | | |
|---|---|---|
| AU | 2397377 A | 10/1978 |
| AU | 504446 B2 | 10/1979 |

(Continued)

OTHER PUBLICATIONS

Co-pending U.S. Appl. No. 16/249,012, filed Jan. 16, 2019.
Co-pending U.S. Appl. No. US 15/911,573, filed Mar. 5, 2016.
Notice of allowance dated Jul. 5, 2016 for U.S. Appl. No. 14/282,965.
Office action dated Jul. 30, 2015 for U.S. Appl. No. 14/282,965.
U.S. Appl. No. 61/938,063, filed Feb. 10, 2014.
Cheung et al. Impact of admixtures on the hydratic kinetics of Portland cement. Cement and Concrete Research 41:1289-1309 (2011).
Co-pending U.S. Appl. No. S16/249,012, filed Jan. 16, 2019.

(Continued)

*Primary Examiner* — James E Mcdonough
(74) *Attorney, Agent, or Firm* — Storella & Witt, LLP

(57) ABSTRACT

A method/system for sequestering carbon dioxide from cement and lime production facilities wherein carbon dioxide from flue gases originating from cement or lime production facilities is recovered and transported to a building materials production facility where it is sequestered.

11 Claims, No Drawings

(56) References Cited

U.S. PATENT DOCUMENTS

| | | |
|---|---|---|
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,375,755 A | 3/1983 | Barbini et al. |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,609,303 A | 9/1986 | Shumaker |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,141,363 A | 8/1992 | Stephens |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,419,632 A | 5/1995 | Stephens |
| 5,427,617 A | 6/1995 | Bobrowski et al. |
| 5,451,104 A | 9/1995 | Kleen et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,803,596 A | 9/1998 | Stephens |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,023,941 A | 2/2000 | Rhoades |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,418,948 B1 | 7/2002 | Harmon |
| 6,451,105 B1 | 9/2002 | Turpin, Jr. |
| 6,463,958 B1 | 10/2002 | Schwing |
| 6,517,631 B2 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 7,966,250 B2 | 6/2011 | Constantz et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 8/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,503,596 B2 | 8/2013 | Sheets |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,028,607 B2 | 5/2015 | Ramme |
| 9,061,940 B2 | 6/2015 | Chen et al. |

(56) References Cited

U.S. PATENT DOCUMENTS

| | | |
|---|---|---|
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B1 | 7/2016 | Niven et al. |
| 9,429,558 B2 | 8/2016 | Boncan et al. |
| 9,448,094 B2 | 9/2016 | Downie et al. |
| 9,463,580 B2 | 10/2016 | Forgeron et al. |
| 9,483,580 B2 | 10/2016 | Forgeron et al. |
| 9,492,945 B2 | 11/2016 | Niven et al. |
| 9,738,562 B2 | 8/2017 | Monkman |
| 9,758,437 B2 | 9/2017 | Forgeron et al. |
| 9,790,131 B2 | 10/2017 | Lee et al. |
| 10,246,379 B2 | 4/2019 | Niven et al. |
| 10,350,787 B2 | 7/2019 | Forgeron et al. |
| 10,392,305 B2 | 8/2019 | Wang et al. |
| 10,570,064 B2 * | 2/2020 | Monkman ............... C04B 28/04 |
| 10,683,237 B2 | 6/2020 | Lee et al. |
| 10,927,042 B2 | 2/2021 | Monkman et al. |
| 11,090,700 B1 | 8/2021 | Camell |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0070448 A1 | 4/2003 | Gasteyer et al. |
| 2003/0122273 A1 | 7/2003 | Fifield |
| 2005/0131600 A1 | 6/2005 | Quigley et al. |
| 2005/0219938 A1 | 10/2005 | Rigaudon et al. |
| 2005/0219939 A1 | 10/2005 | Christenson et al. |
| 2007/0114178 A1 | 5/2007 | Coppola et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0183523 A1 | 7/2008 | Dikeman |
| 2008/0202389 A1 | 8/2008 | Hojaji et al. |
| 2008/0245274 A1 | 10/2008 | Ramme |
| 2008/0264872 A1 | 10/2008 | Konishi et al. |
| 2008/0275149 A1 | 11/2008 | Ladely et al. |
| 2008/0308133 A1 | 12/2008 | Grubb et al. |
| 2008/0316856 A1 | 12/2008 | Cooley et al. |
| 2009/0044832 A1 | 2/2009 | Leonardich et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0086983 A1 | 4/2010 | Gellett et al. |
| 2010/0132556 A1 | 6/2010 | Constantz |
| 2010/0239487 A1 | 9/2010 | Constantz et al. |
| 2010/0246312 A1 | 9/2010 | Welker et al. |
| 2011/0023659 A1 * | 2/2011 | Nguyn ................... C21C 7/076 |
| | | 75/392 |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0262328 A1 | 10/2011 | Wijmans et al. |
| 2011/0277670 A1 | 11/2011 | Self et al. |
| 2011/0281333 A1 | 11/2011 | Brown et al. |
| 2011/0289901 A1 | 12/2011 | Estes et al. |
| 2011/0303551 A1 | 12/2011 | Gilliam et al. |
| 2011/0320040 A1 | 12/2011 | Koehler et al. |
| 2012/0031303 A1 | 2/2012 | Constantz et al. |
| 2012/0153153 A1 | 6/2012 | Chang et al. |
| 2012/0238006 A1 | 9/2012 | Gartner et al. |
| 2012/0290208 A1 | 11/2012 | Jiang et al. |
| 2012/0298011 A1 | 11/2012 | Silva et al. |
| 2012/0312194 A1 | 12/2012 | Riman et al. |
| 2013/0025317 A1 | 1/2013 | Terrien et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 * | 7/2014 | Joensson ................. F25B 25/02 |
| | | 62/333 |
| 2014/0212941 A1 | 7/2014 | Lee |
| 2014/0216303 A1 * | 8/2014 | Lee ......................... B01F 35/91 |
| | | 106/638 |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0069856 A1 | 3/2015 | Jeffrey et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0274537 A1 | 10/2015 | Myers et al. |
| 2015/0298351 A1 | 10/2015 | Beaupré |
| 2015/0345034 A1 | 12/2015 | Sundara et al. |
| 2015/0355049 A1 | 12/2015 | Ait et al. |
| 2016/0001462 A1 | 1/2016 | Forgeron et al. |
| 2016/0107939 A1 | 4/2016 | Monkman et al. |
| 2016/0185662 A9 | 6/2016 | Niven et al. |
| 2016/0272542 A1 | 9/2016 | Monkman et al. |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2017/0252714 A1 | 9/2017 | Bennett et al. |
| 2018/0022654 A1 | 1/2018 | Forgeron et al. |
| 2018/0029934 A1 | 2/2018 | Monkman et al. |
| 2018/0118622 A1 | 5/2018 | Monkman et al. |
| 2018/0252444 A1 | 9/2018 | Nelson et al. |
| 2018/0258000 A1 | 9/2018 | Lee et al. |
| 2019/0168416 A1 | 6/2019 | Monkman et al. |
| 2020/0165170 A1 | 5/2020 | Niven et al. |
| 2020/0223760 A1 | 7/2020 | Monkman et al. |
| 2020/0282595 A1 | 9/2020 | Monkman et al. |
| 2022/0001578 A1 | 1/2022 | Forgeron et al. |
| 2022/0013196 A1 | 1/2022 | Monkman et al. |
| 2022/0065527 A1 | 3/2022 | Forgeron et al. |
| 2022/0194852 A1 | 6/2022 | Thomas et al. |

FOREIGN PATENT DOCUMENTS

| | | |
|---|---|---|
| AU | 2017249444 A1 | 11/2018 |
| CA | 970935 A1 | 7/1975 |
| CA | 1045073 A | 12/1978 |
| CA | 1072440 A | 2/1980 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |

(56) References Cited

FOREIGN PATENT DOCUMENTS

| | | |
|---|---|---|
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CA | 2943791 A1 | 10/2015 |
| CA | 3019860 A1 | 10/2017 |
| CA | 3068082 A1 | 12/2018 |
| CL | 1785744 | 12/2019 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 101844826 A | 9/2010 |
| CN | 203357623 U | 12/2013 |
| CN | 105102370 A | 11/2015 |
| CN | 104045251 B | 6/2016 |
| CN | 105174766 B | 5/2017 |
| CN | 107814530 A | 3/2018 |
| CN | 106746828 B | 5/2019 |
| CN | 110590260 A | 12/2019 |
| DE | 1817001 A | 11/1970 |
| DE | 1817001 A1 | 11/1970 |
| DE | 3139107 A1 | 4/1983 |
| DE | 9506411 A1 | 8/1996 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0639650 A1 | 2/1995 |
| EP | 0573524 B1 | 5/1996 |
| EP | .0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| EP | 3081842 A1 | 10/2016 |
| EP | 3129126 A1 | 2/2017 |
| EP | 3442761 A1 | 2/2019 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| FR | 2805532 A1 | 8/2001 |
| FR | 2969997 B1 | 3/2015 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| GB | 2467005 A | 7/2010 |
| IN | 201817042016 A | 4/2017 |
| IN | 201917054847 A | 12/2019 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2001026418 A | 1/2001 |
| JP | 2001170659 A | 6/2001 |
| JP | 2002012480 A | 1/2002 |
| JP | 2002127122 A | 5/2002 |
| JP | 3311436 B2 | 8/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 3147769 U | 1/2009 |
| JP | 2009115209 A | 5/2009 |
| JP | 2009136770 A | 6/2009 |
| JP | 4313352 B2 | 8/2009 |
| JP | 2010125386 A | 6/2010 |
| JP | 2011073891 A | 4/2011 |
| JP | 2014213479 A | 11/2014 |
| JP | 2017074552 A | 4/2017 |

(56) References Cited

FOREIGN PATENT DOCUMENTS

| | | | |
|---|---|---|---|
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| KR | 100950009 B1 | 3/2010 |
| KR | 20110048266 A | 5/2011 |
| MX | 2018012464 A | 8/2019 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SG | 11201810010 P | 12/2018 |
| SG | 11201912759 R | 1/2020 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-8500587 A1 | 12/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | 2008057275 A2 | 5/2008 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO-2009132692 A1 | 11/2009 |
| WO | 2010048457 A1 | 4/2010 |
| WO | WO-2010074811 A1 | 7/2010 |
| WO | WO-2012079173 A1 | 6/2012 |
| WO | WO-2012081486 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | WO-2014121198 A1 | 8/2014 |
| WO | 2014154741 A1 | 10/2014 |
| WO | WO-2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | WO-2016082030 | 6/2016 |
| WO | WO-2016082030 A1 | 6/2016 |
| WO | WO-2017000075 A1 | 1/2017 |
| WO | WO-2017041176 | 3/2017 |
| WO | WO-2017177324 A1 | 10/2017 |
| WO | 2018232507 A1 | 12/2018 |
| WO | WO-2018232507 A1 | 12/2018 |

OTHER PUBLICATIONS

Cornerstone Custom Concrete, LLC. "How Much Does Concrete Weigh?" Retrieved Jul. 15, 2019. <web.archive.org/web/2013012416082S/http://www.minneapolis-concrete.com/how-much-does-concrete-weigh.html>. One page. (Year: 2013).
"MB-AETM 90: Air-Entraining Admixture" BASF, Product Data (Apr. 2011) 2 pages, found at http://www.basf-admixtures.com/en/products/airentraining/mbae_90/Pages/default.aspx.
PCT Application No. PCT/CA2014/050611 as filed Jun. 25, 2014.
Co-pending U.S. Appl. No. 15/650,525, filed Jul. 14, 2017.
International Search Report and Written Opinion dated Oct. 19, 2016 for International Application No. PCT/CA2016/051062.
Chen, et al. On the kinetics of Portland cement hydration in the presence of selected chemical admixtures. Advances in Cement Research. 1993; 5(17):9-13.
Shi, et al. Studies on some factors affecting CO2 curing of lightweight concrete products. Resources, Conservation and Recycling. 2008: (52)8-9:1087-1092.
Shideler, J. Investigation of the moisture-volume stability of concrete masonry units. Portland Cement Association. 1955. (D3).
Technology Roadmap: Cement. International Energy Agency. Dec. 2009 [Retrieved on Jul. 13, 2013]. Retrieved from http://www.iea.org/publications/freepublications/pubiication/name.3861.en.html.
U.S. Appl. No. 62/705,617, filed Jul. 7, 2020, George Sean Monkman.
ASTM International, "Standard Test Method for Slump of Hydraulic-Cement Concrete," Designation: C143/C143M—15a, Revised 5.1.1., Dec. 15, 2015, 4 pages.
Canadian Intellecual Property Office, Canadian Office Action for Application No. 2,945,060, dated Jan. 20, 2022, 4 pages.
Canadian Intellecual Property Office, Canadian Office Action for Application No. 2,979,471 dated Jul. 10, 2020, 3 pages.
Chile Patent Office, First Office Action for Application No. 3804-2019, dated Mar. 30, 2021, 24 Pages.
Corrected First Office Action for Chilean Application No. 3804-2019, dated Aug. 31, 2021, 51 pages.
Examination Report and translation for Brazilian Application No. 112017010897-6 dated Nov. 23, 2021; 7 pages.
Examination Report for Australian Application No. 2017249444 dated Jul. 28, 2021, 6 pages.
Examination Report for Australian Application No. 2018288555 dated Feb. 20, 2021, 5 pages.
Examination Report for Canadian Application No. 2945060 dated Apr. 19, 2021, 3 pages.
Examination Report for Canadian Application No. 2968246 dated Oct. 22, 2021, 4 pages.
Examination Report for Indian Application No. 201817042016 dated Mar. 4, 2021, 5 pages.
Examination Report for Indian Application No. 201917054847 dated Apr. 20, 2021, 7 pages.
Third Party Submission report for Japanese Application No. JP 2019-571536 mailed Aug. 26, 2021,16 pages.
Examination Report for Singapore Application No. 11201912759R dated Dec. 18, 2021, 5 pages.
Extended European Search Report dated Aug. 18, 2020, for European patent application No. 19207508.3, 9 pages.
Extended European Search Report dated Oct. 8, 2018, for European patent application No. EP15862209.2, 10 pages.
First Written Opinion, issued by the Intellectual Property Office of Singapore, dated Mar. 3, 2020, for Singapore patent application No. 11201810010P, 8 pages.
International Search Report and Written Opinion dated Jan. 13, 2021 for PCT Application No. PCT/US20/54625, 6 pages.
International Search Report and Written Opinion dated Oct. 19, 2021 for PCT Application No. PCT/US21/40764, 11 pages.
International Search Report and Written Opinion dated May 14, 2020 for PCT application No. PCT/US2019/066407, 11 Pages.
International Search Report and Written Opinion dated Jul. 22, 2020 for PCT/IB2020/053953, 12 pages.
International Search Report and Written Opinion dated Aug. 25, 2021 for PCT Application No. PCT/IB2021/055223, 9 pages.
International Search Report and Written Opinion dated Sep. 6, 2018 for PCT/CA2018/050750, 13 pages.
Lu et al., "Carbon Dioxide Sequestration on Recycled Aggregates," Carbon Dioxide Sequestration in Cementitious Construction Materials, Woodhead Publishing Series in Civil and Structural Engineering, 2018, pp. 247-277.
Lu et al., "Effects of Carbonated Hardened Cement Paste Powder on Hydration and Microstructure of Portland Cement," Construction and Building Materials, 186, pp. 699-708 (2018).
Office Action for Chilean Application No. 03376-2020 dated Nov. 18, 2021, 34 pages.

(56) References Cited

OTHER PUBLICATIONS

Ozcan et al., "Process integration of a Ca-looping carbon capture process in a cement plant", International Journal of Greenhouse Gas Control, 2013, vol. 19, pp. 530-540. https://doi.org/10.1016/j.ijggc.2013.10.009).
Shi et al. "Performance Enhancement of Recycled Concrete Aggregate—A Review," Journal of Cleaner Production, 112, pp. 466-472 (2006).
Extended European Search Report for European Application No. 18820477.0 dated Feb. 5, 2021, 11 pages.
Zhan et al. "Carbonation Treatment of Recycled Concrete Aggregate: Effect on Transport Properties and Steel Corrosion of Recycled Aggregate Concrete," Cement and Concrete Composites, 104, pp. 1-8 (Apr. 7, 2019).
EP17781677.4 Extended European Search Report dated Nov. 12, 2019.
U.S. Appl. No. 15/304,208 Office Action dated Oct. 25, 2019.
U.S. Appl. No. 15/650,524 Office Action dated Sep. 17, 2019.
Cheung et al. Impact of admixtures on the hydration kinetics of Portland cement. Cement and Concrete Research 41:1289-1309 (2011).
Co-pending U.S. Pat. Appl. No. 16/249,012, filed Jan. 16, 2019.
Cornerstone Custom Concrete, LLC. "How Much Does Concrete Weigh?" Retrieved Jul. 15, 2019. <web.archive.org/web/20130124160823/http://www.minneapolis-cencrete.com/how-much-does-concrete-weigh.html>. One page. (Year: 2013).
Lobo et al. Recycled Water in Ready Mixed Concrete Operations. Concrete in Focus, Spring 2003 (2003). 10 pages.
"MB-AETM 90: Air-Entraining Admixture" BASF, Product Data (Apr. 2011), 2 pages, found at http://www.basf-admixtures.com/en/products/airentraining/mbae_90/Pages/detault.aspx.
EP14746909.2 Summons to Attend Oral Proceedings dated Jun. 19, 2019.
U.S. Appl. No. 15/304,208 Office Action dated Jan. 24, 2019.
U.S. Appl. No. 15/170,018 Notice of Allowance dated Dec. 19, 2018.
U.S. Appl. No. 15/240,954 Ex Parte Quayle Office action dated Feb. 5, 2019.
U.S. Appl. No. 15/240,954 Notice of Allowance dated Mar. 5, 2019.
U.S. Appl. No. 15/284,186 Office Action dated Jun. 14, 2019.
U.S. Appl. No. 15/828,240 Office Action dated Jul. 22, 2019.
Google Patents Translation of EP1785245. pp. 1-2. Retrieved Jul. 17, 2019. (Year: 2007).
Tri-Cast literature, Dry cast machine. Besser Company. Sioux, Iowa, USA. (Jun. 2009).
Co-pending U.S. Appl. No. 15/911,573, filed Mar. 5, 2018.
Co-pending U.S. Appl. No. 15/649,339, filed Jul. 13, 2017.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.

European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.
Mass. Premixed Cement Paste. Concrete International 11(11):82-85 (Nov. 1, 1989).
Office action dated Oct. 19, 2017 for U.S. Appl. No. 15/228,964.
PCT Application No. PCT/CA2014/050611 as fiied Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011, pp. 993-1000.
Co-pending U.S. Appl. No. 15/650,524, filed Jul. 14, 2017.
Co-pending U.S. Appl. No. 15/659,334, filed Jul. 25, 2017.
European search report with written opinion dated Feb. 2, 2017 for EP2951122.
European search report with written opinion dated Jan. 20, 2017 for EP14818442.
International search report with written opinion dated Jun. 15, 2017 for PCT/CA2017/050445.
International search report with written opinion dated Jul. 3, 2016 for PCT/CA2015/050195.
Notice of allowance dated Apr. 14, 2017 for U.S. Appl. No. 15/157,205.
Notice of allowance dated Apr. 24, 2017 for U.S. Appl. No. 15/161,927.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated May 10, 2017 for U.S. Appl. No. 13/994,681.
Office action dated Jul. 3, 2017 for U.S. Appl. No. 14/171,350.
Yelton, R. Treating Process Water. The Concrete Producer. pp. 441-443. Jun. 1, 1997.
Co-pending U.S. Appl. No. 15/284,186, filed Oct. 3, 2016.
International Search Report and Written Opinion dated Aug. 30, 2016 for International application No. PCT/CA2016/050773.
003 International Search Report and Written Opinion dated Oct. 19, 2016 for International Application No. PCT/CA2016/051062.
Kim, et al. Properties of cement-based mortars substituted by carbonated fly ash and carbonated under supercritical conditions. IJAER. 9(24), 25525-25534 (2014).
Notice of Allowance dated Dec. 21, 2016 for U.S. Appl. No. 15/161,927.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1903; 5(17):9-13.

(56) References Cited

OTHER PUBLICATIONS

"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.
Co-pending U.S. Appl. No. 15/170,018, filed Jun. 1, 2016.
Co-pending U.S. Appl. No. 15/184,219, filed Jun 16, 2016.
Co-pending U.S. Appl. No. 15/228,964, filed Aug. 4, 2016.
Co-pending U.S. Appl. No. 15/240,954, filed Aug. 18, 2016.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 mln in Series B funds," Reuters PE HUB, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
Eurpoean search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: Charleroi Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology, 2005; 39(24):9676-9682.
Huntzinger, et al. Carbon dioxide sequestration in cement kiln dust through mineral carbonation. Environ Sci Technol, Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 13, 2013 for PCT Application No. CA2013/050190.
International search report and written opinion dated Sep. 18, 2014 for PCT/CA2014/050611.
International search report dated May 16, 2014 for PCT Application No. PCT/US14/14447.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems, Materials and Structures, May 28, 2013. DOI 10.1617/S11527-013-0110-9.
Lange, et al. Preliminary investigation into the effects of carbonation on cement-solidified hazardous wastes. Environmental Science and Technology, 1996; 30(1):25-30.
Logan, C. Carbon dioxide absorption and durability of carbonation cured cement and concrete compacts. Thesis. Department of Civil Engineering, McGill University. Montreal, QC, Canada 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada, 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. These from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.

(56) References Cited

OTHER PUBLICATIONS

Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/796,751.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/950,288.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and MacDonald. Sustainability Leads to Durability in the New I-35W Bridge. Concrete International. Feb. 2009; vol. 31 Issue 2. p. 27-32.
"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.
"Pozzolith® 322 N: Water-Reducing Admixture," BASF. Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference, 2010.
Shi, et al. Studies on some factors affecting CO2 curing of lightweight concrete products. Resources, Conservation and Recycling. 2008; (52)6-9:1087-1092.
Shideler, J. Investigation o the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.
Technology Roadmap: Cement. International Energy Agency. Dec. 2009 [Retrieved on Jul. 13, 2013]. Retrieved from http://www.iea.org/publications/freepublications/publication/name.3861.en.html.
Teir, et al. Carbonation of Finnish magnesium silicates for CO2 sequestration. Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Besser Company. Sioux, Iowa, USA.
U.S. Appl. No. 13/660,447, filed Oct. 25, 2012.
U.S. Appl. No. 13/994,881, filed Jun. 14, 2013.
U.S. Appl. No. 14/249,308, filed Apr. 9, 2014.
U.S. Appl. No. 14/282,965, filed May 20, 2014.
U.S. Appl. No. 14/642,536, filed Mar. 9, 2015.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/941,222, filed Feb. 18, 2014.
U.S. Appl. No. 61/976,360, filed Apr. 7, 2014.
U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbo nation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society. 1974; 57(9):394-397.
U.S. Pat. No. 8,845,940, B2, U.S. Appl. No. 13/660,447, Niven et al., Sep. 30, 2014.
U.S. Pat. No. 9,108,883, B2, U.S. Appl. No. 14/249,308, Forgeron et al., Aug. 18, 2015.
U.S. Pat. No. 9,376,345, B2, U.S. Appl. No. 14/642,536, Forgeron et al., Jun. 28, 2016.
U.S. Pat. No. 9,388,072, B2, U.S. Appl. No. 14/701,456, Niven et al., Jul. 12, 2016.
U.S. Pat. No. 9,463,580, B2, U.S. Appl. No. 14/796,751, Forgeron et al., Oct. 11, 2016.
U.S. Pat. No. 9,492,945, B2, U.S. Appl. No. 14/282,965, Niven et al., Nov. 15, 2016.
U.S. Pat. No. 9,738,562, B2, U.S. Appl. No. 15/157,205, Monkman et al., Aug. 22, 2017.
U.S. Pat. No. 9,758,437, B2, U.S. Appl. No. 15/161,927, Forgeron et al., Sep. 12, 2017.
U.S. Pat. No. 9,790,131, B2, U.S. Appl. No. 15/434,429, Lee et al., Oct. 17, 2017.
U.S. Pat. No. 10,246,379, B2, U.S. Appl. No. 15/170,018, Niven et al., Apr. 2, 2019.
U.S. Pat. No. 10,350,787, B2, U.S. Appl. No. 15/240,954, Forgeron et al., Jul. 16, 2019.
U.S. Pat. No. 10,570,064, B2, U.S. Appl. No. 15/184,219, Monkman et al., Feb. 25, 2020.
U.S. Pat. No. 10,654,191, B2, U.S. Appl. No. 15/284,186, Niven et al., May 19, 2020.
U.S. Pat. No. 10,683,327, B2, U.S. Appl. No. 15/828,240, Lee et al., Jun. 16, 2020.

(56) References Cited

OTHER PUBLICATIONS

U.S. Pat. No. 10,927,042, B2, U.S. Appl. No. 15/650,524, Monkman et al., Feb. 23, 2021.
2018-0118622, A1, U.S. Appl. No. 15/703,522, Monkman et al., May 3, 2018.
2018-0022654, A1, U.S. Appl. No. 15/659,334, Forgeron et al., Jan. 25, 2018.
2019-0168416, A1, U.S. Appl. No. 16/155,013, Monkman et al., Jun. 6, 2019.
2020-0165170, A1, U.S. Appl. No. 16/249,012, Niven et al., May 28, 2020.
2020-0282595, A1, U.S. Appl. No. 16/624,776, Monkman et al., Sep. 10, 2020.
2022-0001578, A1, U.S. Appl. No. 17/346,124, Forgeron et al., Jan. 6, 2022.
2022-0013196, A1, U.S. Appl. No. 17/369,911, Monkman et al., Jan. 13, 2022.
2022-0065527, A1, U.S. Appl. No. 17/413,174, Forgeron et al., Mar. 3, 2022.
2022-0194852, A1, U.S. Appl. No. 17/606,415, Thomas et al., Jun. 23, 2018.
Canadian Intellectual Property Office, Canadian Office Action for Application No. 2,943,791 dated Apr. 22, 2021, 3 pages.
Canadian Intellectual Property Office, Canadian Office Action for Application No. 2,943,791 dated May 27, 2022, 3 pages.
Canadian Intellectual Property Office, Canadian Office Action for Application No. 2,943,791 dated Nov. 25, 2021, 4 pages.
Canadian Intellectual Property Office, Canadian Office Action for Application No. 3,120,472 dated Apr. 22, 2022, 3 pages.
Chile Patent Office, First Office Action and Translation for Application No. 3376-2020, dated Nov. 18, 2021, 34 Pages.
Chile Patent Office, Second Examination Report with English Transmittal for Application No. 3376-2020, dated May 16, 2022, 21 Pages.
Chinese International Search Report for Application No. 2019800306982, dated Mar. 25, 2022, 2 pages.
European Communication for European Application No. 17781677.4, dated May 9, 2022, 5 pages.
Examination Report for EP 15777459.7 dated Apr. 17, 2020, 7 pages.
Examination Report for European Application No. 17781677.4 dated May 9, 2022; 5 pages.
Ghacham, "Valorization of waste concrete through CO2 mineral carbonation: optimizing parameter and improving reactivity using concrete separation". Journal of Cleaner Production, 2019, vol. 166, pp. 1-10.
Ho et al., "CO2 Utilization via Direct Aqueous Carbonation of Synthesized Concrete Fines under Atmospheric Pressure". ACS Omega, Jun. 22, 2020 (Jun. 22, 2020), vol. 5, pp. 15877-15890.
International Search Report and Written Opinion dated Mar. 29, 2022 for PCT Application No. PCT/IB2021/000718.
Japanese Patent Application No. 2019-571536, Notice of Reasons for Rejection, (Translation) dated Jun. 8, 2022, 5 pages.
Liang et al., "Utilization of CO2 curing to enhance the properties of recycled aggregate and prepared concrete: A review". Cement and Concrete Composites, Nov. 1, 2019 (Jan. 11, 2019), vol. 105, pp. 1-14 * Abstract;* Section 1.0; * Section 2.2.4; * Fig. 4(d).
Liu, J. et al., "Development of a Co2 solidification method for recycling autoclaved lightweight concrete waste", Journal of Materials Science Letters 20, 2001, pp. 1791-1794.
Summons to Attend Oral Proceedings for EP 15777459.7 mailed Aug. 27, 2021, 7 pages.
Canadian Intellectual Property Office, Canadian Office Action for Application No. 3,120,472 dated Oct. 12, 2022, 4 pages.
Canadian Patent Office, Examination Search Report for CA 2,968,246, dated Aug. 18, 2022, 3 pages.
Examination Report for Australian Application No. 2018288555 dated Aug. 9, 2021, 5 pages.
Extended European Search Report for EP 19894565.1, dated Aug. 3, 2022.
Morocco Patent Application No. 53762 Search Report with Opinion on Patentability, dated Jul. 1, 2022, 4 pages.
Republic of Columbia [translation]; First Exam Report for No. NC2021/0009084, dated Aug. 5, 2022, 13 pages.
Singapore, Invitation to Respond to Written Opinion for Application No. 11221062015, dated Oct. 18, 2022, 2 pages.
Singapore, Written Opinion for Application No. 11221062015, dated Oct. 18, 2022, 8 pages.
U.S. Appl. No. 17/959,013, Niven et al., filed Oct. 3, 2022.
India, Examination Report for Application No. 202127030664 dated Dec. 15, 2022, 7 pages.
Mexican Office Action for Application No. MX/a/2017/006746 dated Dec. 1, 2022, 5 pages.
Canadian Office Action for Application No. 3,019,860 dated Mar. 2, 2023, 3 pages.
Indonesia Application No. P00202105311 Substantive Examination Results Stage I dated Jan. 11, 2023, 8 pages.

* cited by examiner

INTEGRATED CARBON DIOXIDE CAPTURE

CROSS-REFERENCE

This application is a continuation of Ser. No. 15/184,219, filed Jun. 16, 2016, which is a continuation of PCT International Application Serial No. PCT/CA2015/050195, filed Mar. 16, 2015, which claims the benefit of U.S. Provisional Application No. 61/976,360, filed Apr. 7, 2014, which applications are incorporated herein by reference.

BACKGROUND OF THE INVENTION

Worldwide production of cement resulted in 3.6 billion tons of cement produced in 2012 and 1.7 billion tons of carbon dioxide released during the production of that cement. There is a need to efficiently sequester some or all of the carbon dioxide released in the production of cement. Concrete consumption was conservatively estimated to exceed 15 billion tons in 2012, although no precise records are available. The total amount of carbon dioxide emitted to produce one ton of cement will vary depending on the type of process, raw materials, and fuel combusted, but is roughly about 600-800 kg of $CO_2$/ton of cement produced.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Cement and lime production releases $CO_2$ gas by two mechanisms; the calcination of limestone in the raw materials and the combustion of fuels used in the cement and lime manufacturing processes. For this reason, the flue gases from cement and lime production are some of the richest sources of flue gas carbon dioxide. At present this carbon dioxide is generally vented to the atmosphere.

Because of these two sources, the carbon dioxide content of flue gas from cement and lime manufacture may be 14-33% by volume, compared to 4% for a natural gas fired combined cycle power plant and 9-15% for a coal fired power plant. Higher concentrations of $CO_2$ in the flue gas generally require lower costs for capture of the $CO_2$.

The present invention provides integrated methods and compositions for integrating carbon dioxide from cement and lime manufacture and their respective flue gases back into manufacturing processes, such as the cement or concrete manufacturing process; for example, incorporating the carbon dioxide into building products and other products that incorporate a mineral binder, e.g., a cement binder such as Portland cement, that provides minerals, e.g. calcium, magnesium, sodium, and/or potassium minerals such as $CaO$, $MgO$, $Na_2O$, and/or $K_2O$ that react with the carbon dioxide to form carbonate ($CO_2$) bonded products at the building product end of the method or system. Although any binder that provides sufficient minerals and other components to be converted to mineral carbonates upon application of carbon dioxide may be used, for convenience the methods and systems will be described in terms of cements, such as Portland cement. Alternative or additional uses of the carbon dioxide include cooling concrete mixes, e.g., with liquid carbon dioxide, and/or treating process water, for example, to adjust pH to an acceptable level.

In certain embodiments, the invention provides an integrated approach, in which carbon dioxide released from the production of cement at a cement manufacturing facility is used in the process itself, for example, converted to a stable carbonate form, such as a calcium or magnesium carbonate or other carbonate form, in a building material, thus lowering overall carbon dioxide emissions and providing for greater efficiency in the collection, transport, and use of carbon dioxide in the building materials. It is possible with the integrated approach of the invention, that the same carbon dioxide that was released during production of a cement, such as a Portland cement, and used in a building product will be recaptured in the building product during carbonation. However, the carbon dioxide from the cement manufacturing process may also be used in other types of building products that don't contain the cement produced at the specific facility. In addition or alternatively, the carbon dioxide may be used in other aspects of the manufacturing process, such as in cooling concrete and/or treatment of process water.

Cement and lime production is universal and fairly evenly distributed around North America and the world. Cement production stays fairly close to concrete usage due to the relatively high cost of shipping. Thus, in the integrated approach of the invention, transportation costs for the $CO_2$ are minimized, as it is produced at the cement manufacturing facility and may be used at a concrete production facility within a short distance.

The cement and lime manufacturing facilities may utilize any suitable manufacturing process so long as a flue gas is produced at one or more points from which carbon dioxide may be concentrated and separated. In certain embodiments the cement and lime manufacturing processes may include rotary kilns. In certain embodiments, the cement and lime manufacturing processes may include preheaters. In certain embodiments the cement manufacturing process may include a precalcination vessel (Precalciner).

Carbon dioxide may be concentrated and/or extracted from the cement and lime manufacturing processes by any suitable method, such as pre-combustion, oxy-combustion, and post-combustion methods. Any suitable method that generates carbon dioxide of sufficient concentration and purity can be used for the production of building materials.

In certain embodiments the $CO_2$ gas stream may be concentrated before extraction by such means as oxy-combustion and/or indirect calcination. In certain embodiments the $CO_2$ gas stream may be concentrated due to pre-combustion technologies such as the use of metal oxides, etc. In certain embodiments, the carbon dioxide is separated post-combustion. In certain embodiments, the carbon dioxide is separated by use of solid or liquid sorbents, for example, carbonate looping or amine sorbents. In certain embodiments, the carbon dioxide is separated by use of membranes. In certain embodiments, the carbon dioxide is separated by use of cryogenic technology. In certain embodiments, the carbon dioxide is separated by carbonate looping. Any such means of concentrating and extracting a $CO_2$ gas stream from the cement and lime manufacturing processes may be used.

In certain embodiments the $CO_2$ may already be available in a sufficiently concentrated form. These embodiments include the potential use of pre-combustion technologies, oxy-combustion, indirect calcination, etc. In addition, various parts of the cement and lime manufacturing processes produce higher concentrations of carbon dioxide that may be more easily extractable. In particular, in certain embodiments of the invention carbon dioxide is separated from the kiln or preheater flue gas, such as gas from the kiln or preheater exit before or after the kiln/preheater exhaust fan. In these embodiments, the gas may be cleaned, e.g., in a fabric filter, and or cooled to an adequate temperature before further processing. If necessary, additional impurities may be removed at this point. A preferred embodiment utilizes the flue gas with the highest concentration of $CO_2$ and the lowest cost for additional treatment, such as the preheater exhaust gas at the discharge of the exhaust fan.

The concentration and the purity of the carbon dioxide need be no greater than that required by the process in which the carbon dioxide is introduced into the building materials, and/or used in other processes in cement or concrete manufacturing. In general, it is not necessary to achieve food grade carbon dioxide quality. In certain embodiments, a carbon dioxide content of greater than 60%, such as greater than 80%, for example, greater than 90%, with a level of other elements, such as SOx, low enough so as not to interfere with the reuse of the $CO_2$, for example, its introduction into a building product, or use in treating process water, is sufficient. For example, when used in the manufacture of building products, any suitable carbon dioxide content and purity may be used, as long as the quality of the building product is sufficient for its intended purpose, e.g., use of Portland cement in making concrete or mortar.

In certain embodiments, only a portion of the flue gas from the manufacturing processes is used in a treatment process to separate useable carbon dioxide from the flue gas. The portion of flue gas treated may be less than 90, 80, 70, 60, 50, 40, 30, 20, 10, 9, 8, 7, 6, 5, 4, 3, or 2% of the total flue gas produced by the cement or lime manufacturing process. In certain embodiments, the portion of the flue gas treated is less than 10%, for example, less than 7%, such as less than 6%. In certain embodiments, the portion of the flue gas treated to separate carbon dioxide is 1-90%, or 1-70%, or 1-50%, or 1-30%, or 1-20%, or 1-10%. In certain embodiments, the portion of the flue gas treated is 1-10%. In certain embodiments, the portion of the flue gas treated is 1-8%. In certain embodiments, the portion of the flue gas treated is 1-6%. In certain embodiments, the portion of the flue gas treated is 2-8%. In certain embodiments, the portion of the flue gas treated is 2-6%.

In some cases, impurities which normally would be removed before the flue gas is vented to the atmosphere may remain present in the $CO_2$ separated from the flue gas; if these are not harmful to the process of making and/or using the building product, e.g., cement/concrete, into which the $CO_2$ will be introduced. Impurities can include NOx, SOx, HCl, dust, metals, CO and/or volatile organic compounds (VOCs). It can therefore be advantageous to leave them in the $CO_2$ separated from the flue gas; for example, if the carbon dioxide is used in producing building materials, in many cases these constituents will themselves become sequestered in the building product, e.g., cement/concrete, into which the $CO_2$ is introduced, e.g., by chemical reaction to produce relatively inert substances and/or by physical entrapment. In either case, it may be possible to avoid the expense of cleaning the flue gas which would otherwise be required, or use a minimal cleaning.

The efficiency of the process is increased over use of purchased carbon dioxide because of reduced transportation costs, and in addition, energy costs in the production of the carbon dioxide may be lower than in typical carbon dioxide extraction processes because waste heat from the cement or lime production process can be used in the extraction, concentration, or other treatment of the flue gas. Thus, in certain embodiments of the invention, waste heat from the cement and lime manufacturing processes may be used in various processes involved in the concentration, extraction, and/or other treatment of the flue gases. Heat sources include; the waste heat from the preheater exit gases and/or the cooler vent air, radiant heat from the rotary kilns, etc. In certain embodiments, waste heat from a preheater is used in the concentration and/or extraction of carbon dioxide from flue gas. In certain embodiments, waste heat from a cooler is used in the concentration and/or extraction of carbon dioxide from flue gas. In certain embodiments, waste heat from both a preheater and a cooler is used in the concentration and/or extraction of carbon dioxide from flue gas.

Depending on the separation technology and the transport requirements, the carbon dioxide produced may be gas, liquid, solid, or supercritical. In certain embodiments, the carbon dioxide is primarily or entirely gaseous. In certain embodiments, the carbon dioxide is primarily or entirely liquid. Liquid carbon dioxide offers the advantage of easy and efficient transport, and in some cases the carbon dioxide used in the production of building materials is required to be in liquid form. In addition, where cooling of concrete or concrete materials is desired, liquid carbon dioxide is a useful coolant source.

Various processes have been proposed for the capture of carbon dioxide in building products, for example, capturing carbon dioxide in products that comprise a mineral binder, such as a cement, e.g., Portland cement, that contains calcium in an environment such that carbon dioxide will react with the calcium to form calcium carbonate. The carbon dioxide used may be from any source.

Any suitable separation technology may be used; many such technologies are known in the art and any technology that produces a product of sufficient carbon dioxide concentration and, if appropriate, sufficiently low impurities, to be used in the desired processes in cement and/or concrete production, for example, the production of stable carbonates, and/or cooling concrete or concrete components, and/or treating process water, may be used.

An exemplary technology is cryogenic separation; this is exemplary only and not limiting to the type of separation technology used. In one such cryogenic separation process the flue gas stream is dried and cooled, then modestly compressed and cooled to slightly above the frost point of $CO_2$. The gas is then expanded, further cooling the stream and precipitating solid $CO_2$, which is separated from the remaining flue gas. The pure solid $CO_2$ stream is the further pressurized to a liquid state. The cooled $CO_2$ and $N_2$ can be used in a heat exchanger to cool incoming flue gas. The final result is the $CO_2$ in liquid phase and a gaseous stream comprised primarily of nitrogen. The liquid $CO_2$ may be generated and stored at the producing site, and transported as needed to a site where building products are produced, e.g., concrete. Transport may be by any suitable method, such as by road or rail, or pipeline, or a combination thereof. Pipelines can be used for both gaseous and liquid carbon dioxide. The carbon dioxide may be transported as solid, gas, liquid, or any suitable combination thereof. The choice of transport form can depend on the intended final use.

The $CO_2$, e.g., liquid $CO_2$, may be transported to the site of use, e.g., a building products production facility. In general, such a building products facility will use the cement and/or lime produced in the cement or lime manufacturing processes from which the carbon dioxide was obtained; such building material facilities are often close to the cement and/or lime manufacturing facilities, such that the carbon dioxide is transported less than 500, 400, 300, 200, 100, or 50 miles. Thus, in certain embodiments, carbon dioxide is concentrated and/or extracted from a flue gas at a first facility, e.g., a cement and/or lime production facility and transported no more than 500, 400, 300, 200, 100, or 50 miles, to a second facility that is a concrete production facility, and used in one or more processes in the second facility, such as in carbonation of concrete, treatment of process water, and/or cooling of concrete or a concrete component. Exemplary facilities are ready mix concrete batching facilities and precast concrete facilities. In certain embodiments, the carbon dioxide is used in the process of producing a building product, such as concrete or precast concrete products. The $CO_2$ may be used at any suitable stage of the process of producing the building product, e.g., during mixing of the concrete, where it may be introduced into the mixing concrete, such as in a ready mix operation or a precast operation; or post-mixing but upstream from a mold in a precast facility, e.g., in a hopper, or feedbox, or introduced into a stream of concrete moving from hopper to feedbox or feedbox to mold; or at the mold itself, or any combination thereof. In certain embodiments liquid $CO_2$ derived from flue gas at a cement or lime manufacturing facility is introduced into mixing concrete, e.g., concrete containing at least a portion of the cement produced at the cement manufacturing facility. This is, in a sense, a calcium carbonate cycle, with carbon dioxide released from calcium carbonate (limestone) at the cement or lime manufacturing facility and reconverted to calcium carbonate in the concrete (or any other building material comprising the necessary minerals, e.g., calcium, to react with the carbon dioxide). Details of use of carbon dioxide in concrete and concrete materials may be found in U.S. patent application Ser. No. 13/660,447; PCT/CA 2014050611, filed Jun. 25, 2014; U.S. patent application Ser. No. 14/249,308, filed Apr. 9, 2014; and U.S. Provisional Patent Application 61/992,089, filed May 12, 2014; all of which are incorporated by reference herein in their entireties.

Carbon dioxide obtained from cement and/or lime production may additionally, or alternatively, be used in other aspects of the process of production of building materials. For example, in concrete production, process water is produced in various stages of the production and packaging process, such as truck cleanout and other processes, where the process water has a high pH that must be reduced before the water can be discharged. Current treatment methods include the use of HCl, but the process is difficult to control and has safety issues involved with handling a concentrated acid. An alternative method utilizes carbon dioxide addition to the process water. The carbon dioxide forms carbonic acid, a weak acid, that is converted to bicarbonate and ultimately carbonate (e.g., calcium carbonate). As the pH is lowered by these reactions, it eventually reaches 7 or 8, and the precipitated calcium carbonate dissolves, creating calcium bicarbonate. Because of the pKas of the various reactions, the system is buffered and it is easier to achieve the desired pH for discharge. Thus, certain embodiments provide treatment of process water from a manufacturing process that produces high-pH process water, such as concrete manufacture, with carbon dioxide produced in lime and/or cement manufacture to lower the pH of the process water. The carbon dioxide from the lime and/or cement manufacture may constitute any suitable proportion of the total carbon dioxide used in the water treatment process, such as at least 10, 20, 30, 40, 50, 60, 70, 80, 90, 95, or 99% of the carbon dioxide used in the water treatment process, and/or not more than 20, 30, 40, 50, 60, 70, 80, 90, 95, 99, or 100% of the carbon dioxide used in the water treatment process.

An additional or alternative use of carbon dioxide from lime or cement production is in cooling components of concrete, or concrete itself. This can be especially important when concrete is manufactured in warm temperatures, as concrete can be too hot when produced conventionally, so producers cool the raw materials and/or mixed concrete using ice or liquefied gases. Chilled carbon dioxide, e.g., as a gas, solid, liquid, or combination thereof, may be used in one or more aspects of these processes. For example, certain processes for chilling aggregate may use liquid nitrogen or liquid carbon dioxide, sprayed into a cylinder containing aggregate, to cool the aggregate before its use in the manufacture of concrete. See, e.g., U.S. Pat. No. 5,220,732. In other processes, a chilled fluid, such as liquid nitrogen, argon, oxygen, chilled water, or carbon dioxide is applied directly to a mixing concrete mix to cool the temperature of the mix; it will be appreciated that if carbon dioxide is the cooling fluid, carbonation of the mix is likely to occur. In addition, it is possible to apply both gaseous and solid carbon dioxide, produced from liquid carbon dioxide, to a concrete mix or a component of a concrete mix, to achieve both carbonation and cooling. See, e.g., U.S. Pat. No. 8,235,576; U.S. Patent Application Publication No. 2014 0216303; and PCT Patent Application No. PCT/CA 2014050611, filed Jun. 25, 2014. Thus, certain embodiments provide treatment of a concrete component, such as aggregates, or concrete, with carbon dioxide produced in lime and/or cement manufacture to lower the temperature of the component. The carbon dioxide from the lime and/or cement manufacture may constitute any suitable proportion of the total carbon dioxide used in the concrete or concrete component treatment process, such as at least 10, 20, 30, 40, 50, 60, 70, 80, 90, 95, or 99% of the carbon dioxide used in the concrete or concrete component treatment process, and/or not more than 20, 30, 40, 50, 60, 70, 80, 90, 95, 99, or 100% of the carbon dioxide used in the concrete or concrete component treatment process. In certain embodiments, the process is a process of cooling aggregate to be used in a concrete production process to a desired temperature. In certain embodiments, the process is a process of cooling a concrete mix.

The carbon dioxide may be used in cement or concrete production processes, e.g., the production of building materials at low pressures, treatment of process water, and/or cooling of concrete or concrete components, e.g., at a pressure of 0-25 psi, or 0-50 psi, or 0-100 psi; alternatively, the carbon dioxide may be used at high pressure, e.g., at a pressure of greater than 50, 100, 150, 200, 300, 400, or 500 psi, depending on the desired use.

In one embodiment, the invention provides a method of sequestering carbon dioxide from a cement manufacturing facility comprising i) treating flue gas comprising carbon dioxide from the discharge of a preheater exhaust fan at the cement kiln to render the carbon dioxide transportable, e.g., concentrating the carbon dioxide; ii) transporting the carbon dioxide to a building materials production facility; and iii) performing at least one operation of treating one or more building materials with the carbon dioxide in such a manner as to permanently sequester the carbon dioxide; treating a process water produced in the building materials facility with the carbon dioxide to lower a pH of the process water, or treating concrete or a concrete component at the building materials production facility to cool the concrete or component. In certain embodiments, at least two of the operations are performed with the carbon dioxide at the building materials production facility. In certain embodiments, all three of the operations are performed with the carbon dioxide at the building materials production facility. In general less than the entire exhaust flue gas of the preheater is treated to render the carbon dioxide transportable, for example, less than 50%, or less than 40%, or less than 30%, or less than 20%, or less than 10% of the total flue gas produced by the preheater. The transportable carbon dioxide may be liquid carbon dioxide, solid carbon dioxide, or gaseous carbon dioxide, or any combination thereof, and transported by road, rail, or pipeline (liquid and gaseous carbon dioxide) to the building materials production facility. The building materials production facility can be a ready mix facility or a precast facility, and in some cases the cement used at the facility includes the cement produced at the cement manufacturing facility; thus, the entire loop of separation of carbon dioxide and its use in a building material may occur within a radius of less than 500, 400, 200, 100, 80, 60, 50, or 40 miles. If the carbon dioxide is mostly or entirely liquid, it may be used in the production of the building materials in liquid form or, in some cases, in liquid form that is converted upon release to mixing building material to solid and gaseous forms. In some cases, the carbon dioxide may alternatively, or additionally, be introduced into a building material, e.g., concrete, under pressure, such as when the concrete is pumped through a conduit at a building site. Admixtures may also be introduced into the concrete treated with the carbon dioxide from the cement kiln to modulate, e.g., flowability and/or early strength development.

In one embodiment, the invention provides a method of sequestering carbon dioxide from a cement kiln comprising i) treating flue gas comprising carbon dioxide from the cement kiln to render the carbon dioxide transportable in liquid form; ii) transporting the carbon dioxide to a building materials production facility; and iii) treating one or more building materials with the liquid carbon dioxide in such a manner as to permanently sequester the carbon dioxide.

In one embodiment, the invention provides a method of sequestering carbon dioxide from a cement kiln comprising i) treating flue gas comprising carbon dioxide from the cement kiln to render the carbon dioxide transportable; ii) transporting the carbon dioxide to a concrete production facility; and iii) treating a wet concrete mix at the concrete production facility with the carbon dioxide to sequester the carbon dioxide in a concrete product.

In one embodiment, the invention provides a method of sequestering carbon dioxide from a cement kiln comprising i) treating flue gas comprising carbon dioxide from the cement kiln to render the carbon dioxide transportable; ii) transporting the carbon dioxide to a precast concrete production facility; and iii) treating a precast object comprising a cement binder with the carbon dioxide, wherein the treatment with carbon dioxide occurs upstream of a curing operation.

In one embodiment, the invention provides a method of sequestering carbon dioxide from a cement kiln comprising i) treating flue gas comprising carbon dioxide from the cement kiln to render the carbon dioxide transportable; ii) transporting the carbon dioxide to a building materials production facility; and iii) treating one or more building materials with the carbon dioxide to permanently sequester the carbon dioxide wherein the carbon dioxide is contacted with the building material at a pressure of 0-25 psi. In certain embodiments, the carbon dioxide is contacted with the building material at high pressure, for example, greater than 100, or greater than 200, or greater than 300 psi.

In one embodiment, the invention provides a system for integrating carbon dioxide supply and utilization comprising i) a cement kiln comprising a flue gas exit; ii) an apparatus operably connected to the flue gas exit configured to convert carbon dioxide in the flue gas into transportable form; iii) a transport apparatus for transporting the carbon dioxide; iv) a building materials facility configured to use the carbon dioxide in one or more building materials in such a manner as to permanently sequester the carbon dioxide; and v) a transport path connecting the cement kiln and the building materials facility, wherein the transport path is of sufficient strength to allow the transport apparatus to move over it from the cement kiln to the building materials production facility, and wherein the transport path is at least 5 km long. The transport path may be, e.g., a pipeline, a road or a railroad.

In any of these embodiments, the carbon dioxide from the cement kiln may additionally or alternatively be used in treating a process water produced in the building materials facility with the carbon dioxide to lower a pH of the process water, or treating concrete or a concrete component at the building materials production facility to cool the concrete or component. In certain embodiments, at least two of the operations are performed with the carbon dioxide at the building materials production facility. In certain embodiments, all three of the operations are performed with the carbon dioxide at the building materials production facility While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of sequestering carbon dioxide from a cement and production facility comprising
   i) treating flue gas comprising carbon dioxide from a cement manufacturing process of the cement production facility to render the carbon dioxide transportable, wherein the flue gas comprises flue gas from a preheater exhaust gas at a discharge of an exhaust fan;
   ii) transporting the carbon dioxide to a concrete production facility; and
   iii) treating a cement binder mix at the concrete production facility with the carbon dioxide to sequester the carbon dioxide in a concrete product, wherein the cement binder mix comprises cement produced at the cement production facility.

2. The method of claim 1 further comprising concentrating the carbon dioxide.

3. The method of claim 1 further comprising:
   (iv) treating a process water produced in the concrete production facility with the carbon dioxide;
   (v) treating concrete or a concrete component at the concrete production facility to cool the concrete or component;
   Or both (iv) and (v).

4. The method of claim 3 comprising
(iv) treating a process water produced in the concrete production facility with the carbon dioxide.

5. The method of claim 4 wherein the carbon dioxide from the cement production facility comprises a portion of carbon dioxide used to treat the process water, wherein the portion is from 10 to 100%.

6. The method of claim 1 wherein the carbon dioxide is transported no more than 500 miles from the cement production facility to the concrete production facility.

7. The method of claim 1 wherein the carbon dioxide is transported no more than 100 miles from the cement production facility to the concrete production facility.

8. The method of claim 1 wherein the carbon dioxide is contacted with the cement binder mix at a pressure of 0-25 psi.

9. The method of claim 1 wherein the cement production facility comprises a ready-mix concrete batching facility.

10. A method of sequestering carbon dioxide from a cement and production facility comprising
  i) treating flue gas comprising carbon dioxide from a cement manufacturing process of the cement production facility to render the carbon dioxide transportable, wherein waste heat from the cement production facility is used in the concentration or extraction of the carbon dioxide;
  ii) transporting the carbon dioxide to a concrete production facility; and
  iii) treating a cement binder mix at the concrete production facility with the carbon dioxide to sequester the carbon dioxide in a concrete product, wherein the cement binder mix comprises cement produced at the cement production facility.

11. The method of claim 10 wherein the waste heat comprises waste heat from a preheater, waste heat from a cooler, or both.

* * * * *